United States Patent [19]
Sasaki et al.

[11] Patent Number: 6,159,128
[45] Date of Patent: *Dec. 12, 2000

[54] AUTOMATIC TRANSMISSION CONTROL SYSTEM

[75] Inventors: Kazuo Sasaki; Minoru Kuriyama, both of Hiroshima, Japan

[73] Assignee: Mazda Motor Corporation, Hiroshima, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/724,599

[22] Filed: Sep. 30, 1996

[30] Foreign Application Priority Data

Sep. 29, 1995 [JP] Japan ................................. 7-253978

[51] Int. Cl.$^7$ ..................................................... F16H 61/06
[52] U.S. Cl. ......................... 477/143; 477/155; 477/156; 477/163
[58] Field of Search ..................................... 477/143, 156, 477/174, 176, 155, 163

[56] References Cited

U.S. PATENT DOCUMENTS

| | | | |
|---|---|---|---|
| 4,394,827 | 7/1983 | Kubo et al. | 477/156 |
| 4,488,456 | 12/1984 | Taga et al. | 477/163 X |
| 4,998,451 | 3/1991 | Sano | 477/143 |
| 5,052,246 | 10/1991 | Yamaguchi | 477/143 |

FOREIGN PATENT DOCUMENTS 63-180539   4/1988   Japan .

*Primary Examiner*—Sherry Estremsky
*Attorney, Agent, or Firm*—Nixon Peabody LLP; Donald R. Studebaker

[57] ABSTRACT

An automatic transmission control system controls locking pressure for locking a specific friction coupling element to a target level previously determined according to engine output torque and appropriately changes the target level such that, when an increase in engine output torque occurs, a delay of a locking pressure change relative to an engine output torque change becomes greater after the target level has reached near an appropriate level than before it has reached near the appropriate level.

9 Claims, 6 Drawing Sheets

FIG. 3

| RANGE | GEAR | CLUTCH | | | | BRAKE | | | ONE-WAY CLUTCH | |
|---|---|---|---|---|---|---|---|---|---|---|
| | | FORWARD (20) | COAST (21) | 3-4 (27) | REVERSE (24) | 2-4 (23) | | LAW-REVERSE (25) | 1ST (22) | 2ND (26) |
| | | | | | | APPLY | RELEASE | | | |
| P | — | | | | | | | | | |
| R | — | | | | O | | | O | | |
| N | — | | | | | | | | | |
| D | 1ST | O | | | | | | | O | |
| D | 2ND | O | O | | | O | | | O | O |
| D | 3RD | O | O | O | | △ | O | | O | |
| D | 4TH | O | | O | | O | | | △ | |
| 2 | 1ST | O | | | | | | | O | O |
| 2 | 2ND | O | O | | | O | O | | O | |
| 2 | 3RD | O | O | O | | △ | O | | O | |
| 1 | 1ST | O | | | | | O | O | O | |
| 1 | 2ND | O | O | | | O | | | O | |

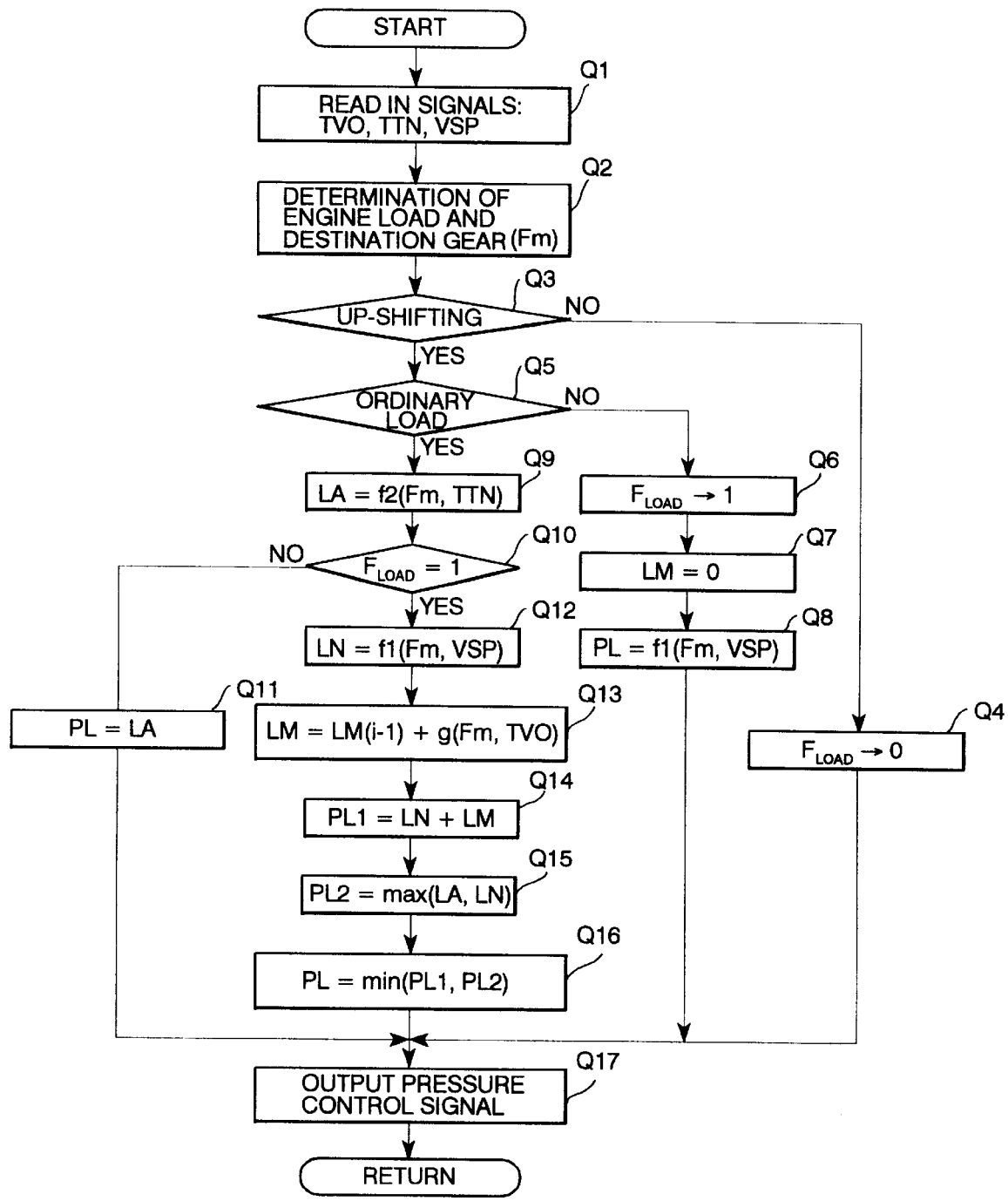

AUTOMATIC TRANSMISSION CONTROL SYSTEM

BACKGROUND OF THE INVENTION

1. Field of the Invention

The present invention relates to an automatic transmission control system for automotive vehicles.

2. Description of Related Art

Automatic transmissions for, in particular, automotive vehicles comprise multiple speed transmission gear mechanisms, such as planetary gears. Such a multiple speed transmission gear mechanism includes a plurality of friction coupling elements, such as brakes and clutches, which are selectively activated to provide torque transmission paths for various gears. One of multiple speed automatic transmissions of this type is known from, for instance, Japanese Patent Publication No. 63-18053. It is typical for the multiple speed automatic transmission to be equipped with a torque converter.

Friction coupling elements of the multiple speed automatic transmission of this type are operated by a hydraulic control system. Each friction coupling element is locked with locking force variable according to pressure supplied thereto. While the locking pressure must be higher than a specific level, it is undesirable for the friction coupling element to be supplied with an excessive level of pressure from the view point of fuel efficiency and shift shock. For this reason, the locking pressure is typically developed according to engine output torque.

The friction coupling element must be coupled with coupling or locking force appropriately strong to transmit the engine output torque to the transmission gear mechanism without causing slippage. For stable operation of the transmission gear mechanism, the hydraulic pressure is practically supplied to the frictional coupling element so as to generate the locking force slightly higher than the appropriate level. Because the locking force widely different from the appropriate level causes aggravation of fuel efficiency, the hydraulic pressure is altered according to the engine output torque so as to cope with a change in the appropriate level.

In a region where the engine output torque is small, as the engine throttle increases its opening, and hence the engine increases its output torque, the state of torque transmission shifts from an ordinary load region where torque is transmitted to the transmission from the engine to a reverse load region where torque is transmitted from the transmission to the engine. The locking pressure may be a zero level when the engine output torque reaches a transitional level at which the state of torque transmission is changed over between the ordinary and reverse load regions. In the ordinary load region where the engine produces output torque greater than the transitional level, the locking pressure is increased with an increase in the engine output torque.

If the locking pressure greater than the appropriate level is supplied to a friction coupling element during a gear shift, the automatic transmission produces what is called shift shock. For this reason, during a gear shift, the locking pressure is typically brought close to but above the appropriate level by reducing a margin of pressure for stable operation.

When stepping on an accelerator pedal with an intention to increase the engine output torque during a gear shift where the pressure margin is small, such as an up-shift, the friction coupling element experiences a lack of torque transmission capacity which always results in an increase in turbine speed. Accordingly, the automatic transmission loses the engine torque by an amount spent on the increase in turbine speed. Because the lose of input torque to the transmission is, however, ignored in the determination of the locking pressure based on the engine output torque, a change in locking pressure becomes greater than a change in the input torque, the friction coupling pressure is supplied with the locking pressure in excess. In particular, in an extent of small engine output torque which ranges both the in ordinary load region and reverse load region, when the accelerator pedal is stepped on with a result of changing over from the reverse load region to the ordinary load region during a gear shift, in particular an up-shift, an excess of locking pressure becomes more significant, causing sharp or sudden shift shock.

SUMMARY OF THE INVENTION

It is an object of the present invention to provide a control system for an automobile automatic transmission which can prevents sudden shift shock caused due to an excess of locking pressure supplied to a friction coupling element.

The aforesaid object of the present invention is achieved by providing an automatic transmission control system for an automobile automatic transmission of a type having a plurality of frictional coupling elements which are selectively locked and unlocked to change a power transmission path of a transmission gear mechanism to place an automatic transmission into desired gears. The transmission control system determines a target level of locking pressure to be supplied to a specific friction coupling element according to the engine output torque and controls the locking pressure to attain the target level. When an increase in the engine output torque is detected, a delay in a change in the locking pressure relative to a change in the engine output torque is corrected to become greater after the target level has reached the appropriate level than before it has reached the appropriate level.

Alternatively, when an increase in the engine output torque is detected at rising of the locking pressure, a delay in a change in the locking pressure relative to a change in the engine output torque is corrected to becomegreater after the target level has reached the appropriate level than before it has reached the appropriate level.

BRIEF DESCRIPTION OF THE DRAWINGS

The above and other objects and features of the present invention will be clearly understood from the following description with respect to a preferred embodiment thereof when considered in conjunction with the accompanying drawings, in which:

FIG. 3 is a table of activated friction coupling elements for possible gears of the automatic transmission;

FIG. 6 is a flow chart illustrating a locking pressure control routine for a microcomputer of the automatic transmission control system in accordance with an embodiment of the invention.

DETAILED DESCRIPTION OF THE PREFERRED EMBODIMENTS

Figure 1:
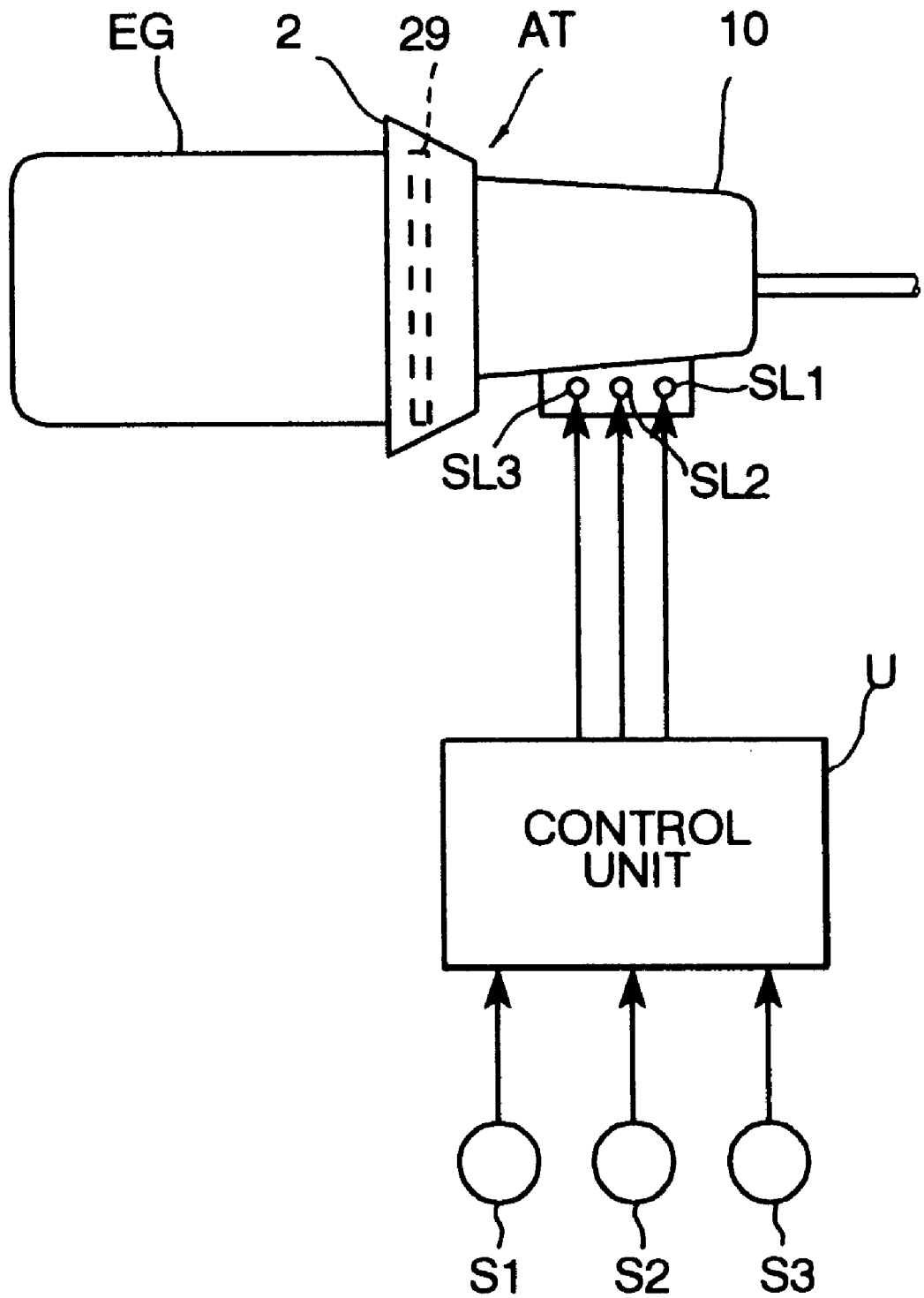
FIG. 1 is a schematic illustration showing an automatic transmission equipped with a control system of the invention.

Referring to the drawings in detail, in particular, to FIG. 1 schematically showing an automatic transmission AT controlled by a control system in accordance with an embodiment of the invention. Torque from an engine EG whose load is adjusted by controlling an engine throttle (not shown) is transmitted to driving wheels through the automatic transmission AT. Operation of the automatic transmission is controlled by a control unit U comprising a microcomputer which incorporates a central processing unit (CPU), a read only memory (ROM) and a random access memory (ROM).

Figure 2:
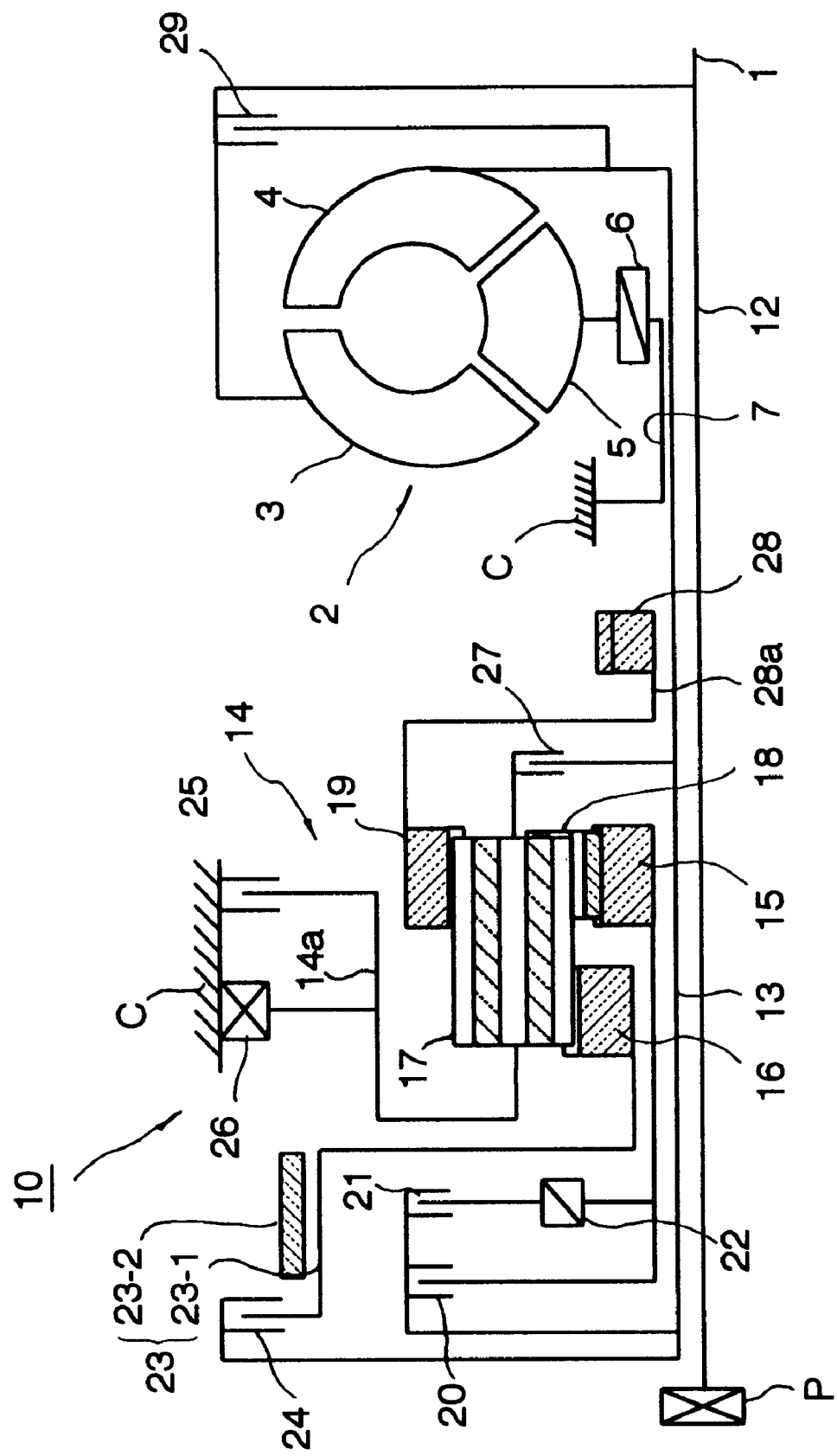
FIG. 2 is a skeleton diagram of an automatic transmission.

As shown in FIG. 2, the automatic transmission AT includes, in order from the engine GE, a torque converter 2 and a multiple speed transmission gear mechanism (which is hereafter referred to as a transmission gear mechanism for simplicity) 10 coaxially with a crankshaft 1 of the engine GE. The torque converter 2 has a pump 3 fastened to the crankshaft 1, a turbine 4 and a stator 5 mounted for rotation on a stationary shaft 7 secured to a casing C of the transmission gear mechanism 10 through a one-way clutch 6. This one-way clutch 6 permits rotation of the stator 5 in one direction in which the pump 3 rotates and, however, prevents it from rotating in the opposite or reverse direction. The torque converter 2 is equipped with a lockup clutch 29 which mechanically couples the pump 3 and turbine 4 together when the lockup clutch is activated and uncouples them during a gear shift.

Transmission gear mechanism 10 is installed to a center shaft 12 having one end secured to the crankshaft 1 and another end connected to an oil pump P affixed to a side wall of the transmission casing C. A hollow turbine shaft 13 is fitted onto the center shaft 12 and has one end fastened to the turbine 4 and another end supported for rotation by the side wall of the transmission casing C. The transmission gear mechanism 10 includes a planetary gear 14 installed to the turbine shaft 13 which has a small diameter of sun gear 15, a large diameter of sun gear 16 located on one side of the small sun gear 15 remote from the engine EG, a long pinion gear 17, a short pinion gear 18 and a ring gear 19.

Frictional coupling elements, namely a forward clutch 20 and a coast clutch 21, are arranged side by side on one side of the planetary gear 14 remote from the engine EG. The forward clutch 20, which provides forward gears, connects and disconnects transmission of engine torque between the turbine shaft 13 and the small sun gear 15 through a first one-way clutch 22. The coast clutch 21, which is in parallel to the forward clutch 20 with respect to the turbine shaft 13, connects and disconnects transmission of engine torque between the turbine shaft 13 and the small sun gear 15. A 2/4 brake 23 as a friction coupling element is located radially outside of the coast clutch 21. This 2/4 brake 23 is of a type comprising a brake drum 23-1 connected to the large sun gear 16 and a brake band 23-2. A reverse clutch 24 as a friction coupling element, which is located radially outside of the forward clutch 20 and aside the 2/4 brake 23 in order to provide a reverse gear, connects and disconnects transmission of engine torque between the large sun gear 16 and the turbine shaft 13 through the brake drum 23-1. A low/reverse brake 25 is located radially outside of the planetary gear 14 and connects a carrier 14a of the planetary gear 14 to the transmission casing C and disconnects it from the transmission casing C. A second one-way clutch 26 is located between the 2/4 brake and low/reverse brake 25 and in parallel to the low/reverse brake 25. This second one-way clutch 26 connects and disconnects the carrier 14a with the transmission casing C. A 3/4 clutch 27 as a friction coupling element, which is located on one side of the planetary gear 14 closer to the engine EG, connects and disconnects transmission of engine torque between the turbine shaft 13 and the carrier 14a of the planetary gear 14. On one side of the 3/4 clutch 27 closer to the engine there is an output gear 28 connected to the ring gear 19 by means of an output shaft 28a. As will be described later, the 2/4 brake 23, which is of a type having a brake apply pressure chamber and a brake release pressure chamber, applies brake only when pressure is supplied into the brake apply pressure chamber and discharged from the brake release pressure chamber and releases brake in all other cases. The clutches and brakes other than the 2/4 brake 23 are of a type having a single pressure chamber and are activated when pressure is supplied into the pressure chamber.

The transmission gear mechanism 10 itself provides four forward gears and a reverse gear by selectively activating the friction coupling elements, in particular the clutches 20, 21, 24 and 27 and the brakes 23 and 25 as shown in Table in FIG. 3. In Table, the friction coupling element marked with a circle is activated in the specific gear, and the friction coupling element marked with a triangle is activated in the specific gear and, however, does not take part in transmission of engine torque.

Control unit U governs gear shift control, lockup control and hydraulic pressure control. This control unit U stores data of programmed or scheduled gear shift patterns defined with parameters including engine load and vehicle speed and generates and sends a gear shift command signal according to engine load and vehicle speed to a gear shift solenoid SL1. The control unit U further stores data of programmed or scheduled lockup patterns defined with parameters including engine load and vehicle speed and generates and sends a lockup command signal according to engine load and vehicle speed to a lockup solenoid SL2. In order to regulate pressure to be supplied to the respective friction coupling elements, the control unit U controls a pressure regulation solenoid SL3. Control parameters, such as engine load or engine throttle opening, vehicle speed and turbine torque, are monitored by means of sensors S1, S2 and S3. Engine load is, in this embodiment, monitored in the form of the opening of an engine throttle.

The following description is directed to a sudden increase in engine speed due to lack of locking pressure during a gear shift and sharp or sudden shock resulting from an excess of locking pressure developing after the gear shift with respect to an up-shift from a first (1st) gear to a second (2nd) gear in a region of small throttle opening less than, for instance, several percent.

Figure 4:
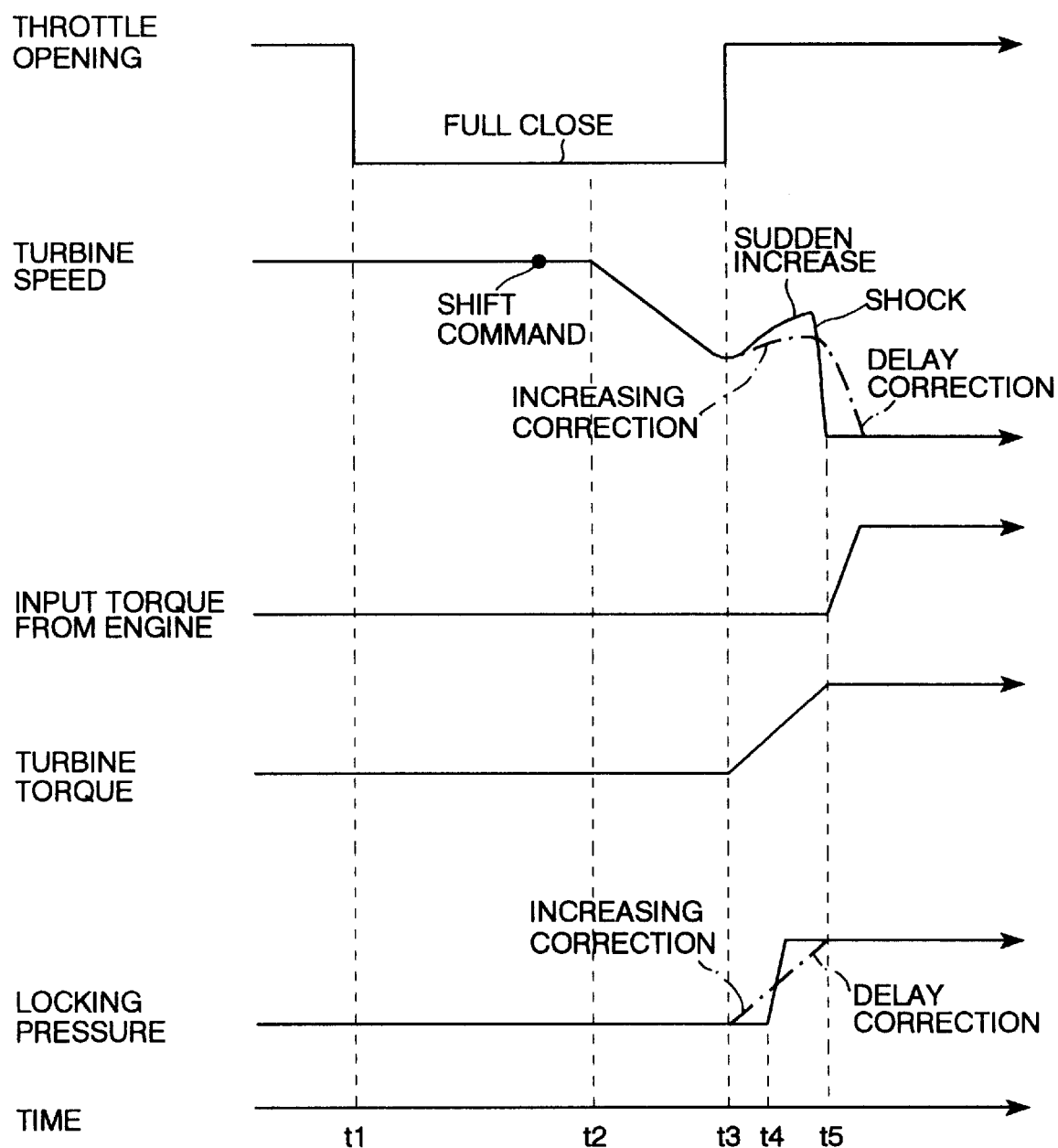
FIG. 4 is a time chart of locking pressure control.

Referring to FIG. 4 which is a time chart of an up-shift from the first (1st) gear to the second (2nd) gear, an up-shift is caused after a time t1 that the engine throttle is in its fully closed position. An up-shift command signal is provided a little earlier than a time t2 at which the speed of turbine 4 starts to decrease due to selective activation and deactivation of specific friction coupling elements, in other words, the transmission gear mechanism 10 enters an inertia phase of operation. On the way of a decrease in turbine speed, the engine throttle opens at a time t3. At this time, while an increase in input torque to the automatic transmission At from the engine is relatively quick, an increase in turbine torque is gentle. Locking pressure supplied to the 2/4 brake 23 starts to rise at a time t4 after a long time from the time t3. Due to the delay of an increase in locking pressure, the 2/4 brake 23 experiences lack of locking pressure, resulting in a sudden increase in the speed of turbine shaft 13, and hence the speed of engine EG. As will be described later, in order for the engine to be prevented from causing a rapid increase in speed, the utilization is made of a pressure correction where the locking pressure is instantaneously increased to a level higher than an appropriate level.

While the locking pressure has reached a sufficiently high level after the time t4 at which the engine speed possibly rises suddenly, the turbine torque is still below a sufficient high level. Consequently, the locking pressure is in excess of the appropriate level after the sudden increase in engine speed, resulting in a sudden decrease in turbine speed which always causes shock. As will be described later, in order for the automatic transmission to be prevented from causing shock due to a rapid decrease in turbine speed, the utilization is made of a pressure correction where the rate of increase in the locking pressure is changed lower than a rate at which the locking pressure is increased to the appropriate level.

As shown by dotted line in FIG. 4, the correction yields an appropriate change in locking pressure such that the locking pressure is increased to prevent or significantly reducing a sudden increase in engine speed when the engine throttle is opening more greater during the up-shift and, after conclusion of the up-shift, the rate of increase in locking pressure is lowered to prevent a sudden decrease in turbine speed.

Figure 5:
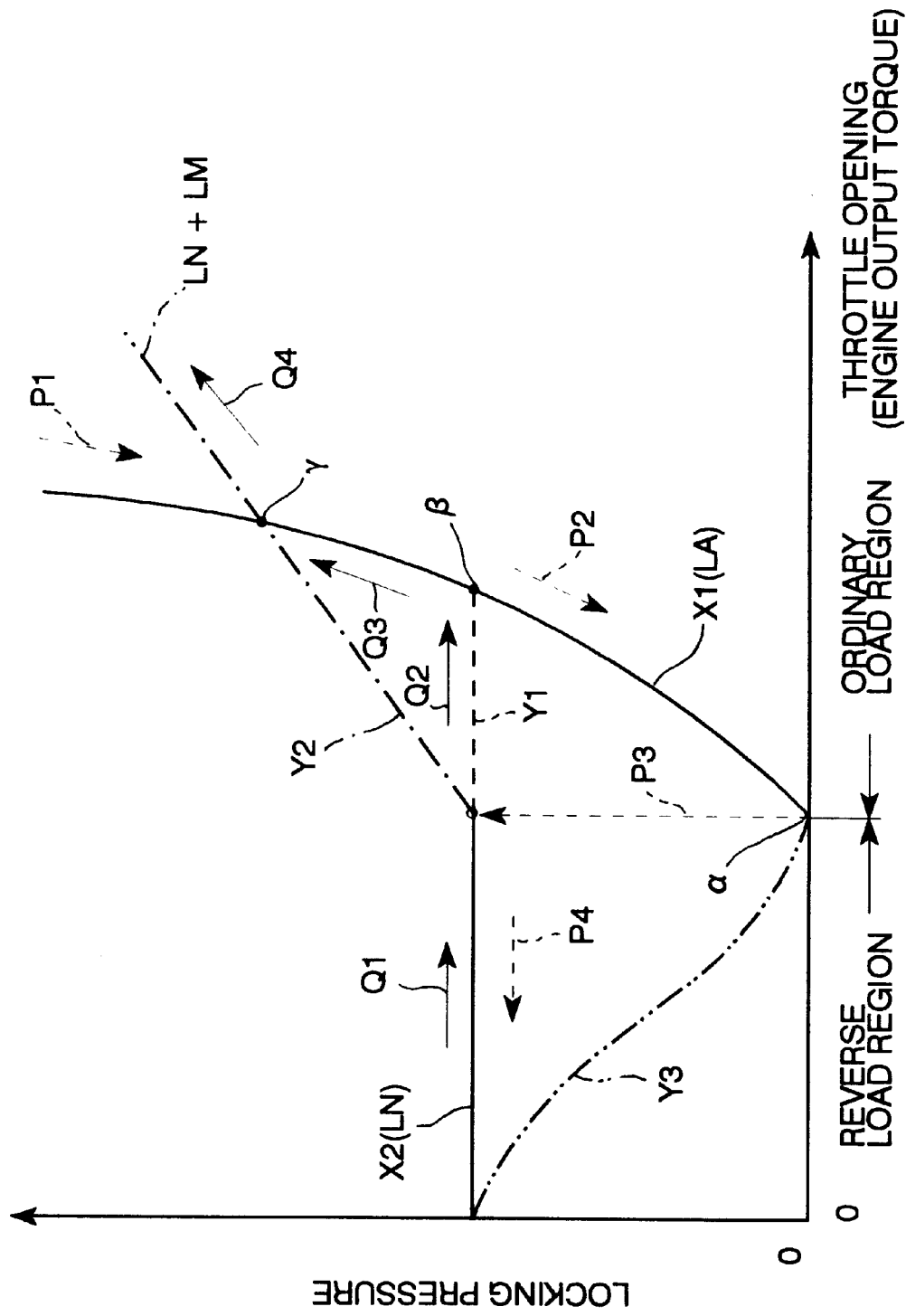
FIG. 5 is a graphical diagram showing the relationship between target pressure level and engine output torque.

FIG. 5 shows an example of a locking pressure control pattern necessary to prevent the above described sudden increase in engine speed and sudden decrease in turbine speed. In the control pattern, engine throttle opening corresponding to torque generated by the engine EG is employed as a parameter. As shown in FIG. 5, engine operating conditions are divided into two regions on opposing sides of a specific throttle opening a as a boundary, namely a ordinary load region where torque is transmitted from the engine EG to the automatic transmission At and a reverse load region where torque is transmitted from the automatic transmission At to the engine EG.

In the ordinary load region, a first target locking pressure LA according to engine torque is given by a target level curve X1. Specifically, the target locking pressure LA is at a zero level for the boundary throttle opening $\alpha$ and increases non-linearly with an increase in engine throttle opening. While this first target locking pressure LA is practically higher than an appropriate level determined based on engine output torque, it is established in this example to be equal to the appropriate level. In the reverse load region, a second target locking pressure LN is given by a straight target level line X2, which is fixed irrespective of engine throttle opening. While this second target locking pressure LN is practically needed to be greatly higher than 0 (zero) for the fully closed position of the engine throttle, it is established in this example to be equal to the appropriate level, it is established in this example to be equal to or slightly higher than an appropriate level for the fully closed engine throttle opening. In particular, the second target locking pressure LN is established to become higher with an increase in vehicle speed which represents inertia of a driving system. Data of the first and second target levels LA and LN are stored in the ROM of the control unit U.

The target level of locking pressure is also given by straight target level lines Y1 and Y2. The target level line Y1 is in alignment with the target level line X2 and extends to the target level curve X1 at throttle opening $\beta$. Accordingly, the target locking pressure given by the target level line Y1 is fixed irrespective of engine throttle opening and is at the same level given by the target level line X1. The target level line Y2, which is established according to engine throttle opening as a parameter, has an increasing rate of locking pressure according to engine output torque smaller than that defined by the target level curve X1. As shown, this target level line Y2 extends from the line target level X2 at the boundary throttle opening $\alpha$ and passes across the target level curve X1 at throttle opening $\gamma$. That is, the target level line Y2 defines a linear change in the target locking pressure according to an increase in engine throttle opening. The utilization of the target level line Y2 performs delay correction of an increase in locking pressure with respect to an increase in engine output torque.

Locking pressure control patterns are selective according to changes in engine operating conditions. When the engine operating condition is shifting from the ordinary load region toward the reverse load region, the target locking pressure changes taking a route indicated by broken arrows P1–P4. Specifically, the target locking pressure decreases along the target level curve X1 to the zero level at the boundary throttle opening $\alpha$ with an decrease in engine throttle opening, then jumps up to the level defined by the target level line X2 all at once, and holds the level continuously irrespective a further decrease in engine throttle opening. In other words, during change in engine operating condition from the ordinary load region to the reverse load region, the first and second target locking pressures LA and LN fundamentally established are used. On the other hand, when the engine operating condition is reversely shifting from the reverse load region toward the ordinary load region, the target locking pressure changes taking a route indicated by solid arrows Q1–Q4. Specifically, the target locking pressure holds a level defined by the target level lines X2 and Y1 until the engine throttle opening reaches the throttle opening $\beta$, then increases relatively sharply along the target level curve X1 until the engine throttle opening reaches the throttle opening $\gamma$, and, thereafter, gradually and linearly along the target level line Y2 with an increase in engine throttle opening. Accordingly, the target locking pressure increases at a rate engine throttle opening greater than the specific opening $\gamma$ less than that for those less than the specific opening $\gamma$.

As apparent from the above, during a transition from the reverse load region to the ordinary load region, the increasing correction of locking pressure is executed by setting the target locking pressure at the second target locking pressure LN higher than the target locking pressure LA, preventing or significantly reducing a sudden increase in engine speed. The delay correction of locking pressure is executed by lowering the locking pressure along the target level line Y2 at an increasing rate of locking pressure lower than the target level curve X1, preventing a sudden increase in turbine speed which always results in shift shock.

A target level curve Y3 is ideally established for the reverse load region to control the locking pressure more appropriately in order to provide the improvement of fuel efficiency, as shown by a double-dotted line in FIG. 5. Specifically, with a decrease in throttle opening from the boundary throttle opening $\alpha$, the target locking pressure gradually increases and reaches the appropriate level at the fully closed position. While the second target level line X2, which establishes the target locking pressure higher than the target level curve Y3, provides aggravation of fuel efficiency as compared with the target level curve Y3, it is desirable to set the target locking pressure for the fully closed position of the engine throttle to be higher than the appropriate level at that position in order to yield more effective prevention of a sudden increase in engine speed.

Specific locking pressure control patterns similar to the pattern for the up-shift from the first gear to the second gear are established according to possible up-shifts and down-shifts.

FIG. 6 shows a flow chart illustrating the locking pressure control sequence routine. The flow chart logic commences and control proceeds directly to a function at step Q1 where parameters, including throttle opening TVO, vehicle speed VSP and turbine torque TTN monitored by the sensors S1–S3, are read in the control unit U. Based on these parameters, a destination gear Fm to which the automatic transmission be shifted and an engine operating region are determined at step Q2. A judgement of engine operating region is made based on the throttle opening TV0. Subsequently, a determination is made at step Q3 as to whether the automatic transmission AT is shifting up, that is, whether the transmission gear mechanism 10 has entered an inertia phase of operation during which the turbine 4 is changing its speed. Alternatively, the determination may be made based on the state of a shift flag that is set up in response to a shift conclusion after the occurrence of a specific shift command signal. If the answer to the determination is negative (NO), this indicates that the locking pressure control is unnecessary, then, after resetting a load flag $F_{load}$ to a state of "0" at step Q4, the sequence returns to step Q1. The load flag $F_{load}$ is up or set to a state of "1" when the engine EG is in the reverse load region.

When the answer to the decision is affirmative (YES), a determination is made at step Q5 as to whether the engine EG is in the ordinary load region. When the engine EG is in the reverse load region, after setting the load flag $F_{load}$ to the state of "1" at step Q6, an additional pressure LM for establishing a target level line Y2 is cleared at step Q7. Subsequently, at step Q8, an eventual target locking pressure PL is established according to the vehicle speed VSP and destination gear Fm for the second target locking pressure LN. On the other hand, when the answer to the decision made at step Q5 is affirmative (YES), the first target locking pressure LA is provisionally established according to the destination gear Fm and turbine torque TTN at step Q9. Subsequently, when the load flag $F_{load}$ has been reset to the state of "0" at step Q10, this indicates that the engine operating condition has not yet shifted into the ordinary load region from the reverse load region, then, the provisional first target locking pressure LA is employed as it is as the eventual target locking pressure PL at step Q11.

Further, when the answer to the determination made at step Q10 is affirmative (YES), this indicates that the engine operating condition has shifted into the ordinary load region from the reverse load region, then, the second target locking pressure LN is provisionally established according to the destination gear Fm and the vehicle speed VSP at step Q12. The affirmative answer to the decision at step Q10 indicates that there has been no operational change of the engine from the no-loaded state to the loaded state. Subsequently, at step Q13, the latest additional pressure LM(i) is obtained by adding to the last additional pressure LM(i-1) an increment g determined according to the destination gear Fm and throttle opening TVO. This increment g corresponds to a changing rate of the target level line Y2 and is less than the changing rate of the first target level line X1 for the first target locking pressure LA. At step Q14, a provisional eventual locking pressure PL1, which corresponds to the target locking pressure represented by the target level line Y2, is calculated by adding the first target locking pressure PL and latest additional pressure LM together. Further, at step Q15, either one of the first and second target locking pressures LA and LN which is higher than the other is selected as a provisional eventual locking pressure PL2 which corresponds to the target locking pressure represented by the target level curve X1 for the engine operating condition after the throttle opening D but before the throttle opening γ. Subsequently, at step Q16, either one of the provisional eventual target locking pressures PL1 and PL2 which is lower than the other is selected as the eventual target locking pressure PL.

Subsequently to either one of steps Q8, Q11 and Q16, where the eventual target locking pressure PL is established, at step Q17, the control unit U generates and sends a pressure control signal to the pressure regulation solenoid SL3 to develop the eventual target locking pressure PL for the friction coupling elements to be activated for causing the automatic transmission AT to make the up-shift from the first gear to the second gear.

The engine output torque may be theoretically calculated from the amount of intake air introduced into the engine and the speed of the engine. In this case, the throttle opening may be substituted for the turbine torque used at step Q9 of the flow chart shown in FIG. 6. The turbine torque can be determined from turbine speed, engine speed and engine output torque. The engine output torque is determined by looking a table defining engine output torque with respect to an advancing angle of ignition timing which is determined based on engine speed and the amount of intake air. Further, appropriate parameters relating to engine output torque may be employed in place of engine throttle opening corresponding to engine load.

The automatic transmission AT may incorporate any multiple speed transmission gear mechanisms in place of the planetary gear 14. In addition, electromagnetic clutch and brakes may be installed in place of the hydraulically controlled clutches and brakes as friction coupling elements.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An automatic transmission control system for selectively activating friction coupling elements to change a power transmission path of a transmission gear mechanism and controlling locking pressure supplied to the friction coupling elements to provide a desired gear ratio between an engine speed of rotation and a speed of rotation of drive wheels, said automatic transmission control system comprising:

pressure regulating means for regulating a locking pressure level of locking pressure to be supplied to a specific one of said frictional coupling elements;

torque monitoring means for monitoring input torque transmitted to the transmission gear mechanism from an engine;

gear shift monitoring means for monitoring an occurrence of an up-shift of the automatic transmission; and control means for determining first, second and third target locking pressure appropriate to prevent the automatic transmission from causing a shift shock according to said input torque during said occurrence of an up-shift, said first target locking pressure being determined by a first function such as to increase with an increase in said input torque, said second target locking pressure being determined by a second function such as to be lower than said first target locking pressure for every said input torque while said input torque is in a first range greater than a first specified torque, and said third target locking pressure being determined by a third function such as to be higher than said first target locking pressure while said input torque is in a second range smaller than a second specified torque smaller than said first specified torque, controlling said pressure regulating means to provide said first target locking pressure during said occurrence of an up-shift when said torque monitoring means monitors said input torque indicating that the engine stays in a loaded state, controlling said pressure regulating means to regulate said locking pressure to said second target locking pressure lower than said first target locking pressure during said occurrence of an up-shift when said torque monitoring means monitors said input torque indicating an operational change of the engine from a no-loaded state to said loaded state and being greater than said first specified torque, and controlling said pressure regulating means to regulate said locking pressure to said third target locking pressure when said torque monitoring means monitors said input torque indicating an operational change of the engine from said no-load state to said load state and being smaller than said second specified torque.

2. The automatic transmission control system as defined in claim 1, wherein said first target locking pressure is set to the lowest level at which said input torque is transmitted to the drive wheels without any loss.

3. The automatic transmission control system as defined in claim 1, wherein said torque monitoring means monitors opening of an engine throttle for said input torque and wherein said control means determines said first target locking pressure from data on input torque specified according to said opening of said engine throttle.

4. The automatic transmission control system as defined in claim 1, wherein said torque monitoring means monitors the amount of intake air for said input torque and wherein said control means determines an advancing angle of ignition timing according to said engine speed and said amount of intake air, determines engine output torque of said engine from data of engine output torque specified according to said advancing angle of ignition timing and determines said input torque based on said output torque and said engine speed.

5. The automatic transmission control system as defined in claim 1, and further comprising speed detecting means for detecting an input speed of rotation to the transmission gear mechanism, wherein said gear shift monitoring means determines that the automatic transmission is under a gear shift based on detection of a continuous change in said input speed of rotation indicating an inertia phase during a gear shift by said speed detecting means.

6. An automatic transmission control system for selectively activating friction coupling elements to change a power transmission path of a transmission gear mechanism and controlling locking pressure supplied to the friction coupling elements to provide a desired gear ratio between an engine speed of rotation and a speed of rotation of drive wheels, said automatic transmission control system comprising:

pressure regulating means for regulating a locking pressure level of locking pressure to be supplied to a specific one of said frictional coupling elements;

torque monitoring means for monitoring the amount of intake air for input torque transmitted to the transmission gear mechanism from an engine;

gear shift monitoring means for monitoring an occurrence of an up-shift of the automatic transmission; and control means for determining an advancing angle of ignition timing according to said engine speed and said amount of intake air, determining engine output torque of said engine from data of engine output torque specified according to said advancing angle of ignition timing, determining said input torque based on said engine output torque and said engine speed, determining first and second target locking pressure appropriate to prevent the automatic transmission from causing a shift shock according to said input torque during said occurrence of an up-shift, said first target locking pressure being determined by a first function such as to increase with an increase in said input torque and said second target locking pressure being determined by a second function such as to be lower than said first target locking pressure for every said engine output torque while said engine output torque is in a first range greater than a first specified output torque, controlling said pressure regulating means to regulate said locking pressure to said first target locking pressure during said occurrence of an up-shift when said torque monitoring means monitors said input torque indicating that the engine stays in a loaded state, and controlling said pressure regulating means to regulate said locking pressure to said second target locking pressure during said occurrence of an up-shift when said torque monitoring means monitors said input torque indicating an operational change of the engine from a no-loaded state to said loaded state and being greater than said first specified torque.

7. An automatic transmission control system for selectively activating friction coupling elements to change a power transmission path of a transmission gear mechanism and controlling locking pressure supplied to the friction coupling elements to provide a desired gear ratio between an engine speed of rotation and a speed of rotation of drive wheels, said automatic transmission control system comprising:

pressure regulating means for regulating a locking pressure level of locking pressure to be supplied to a specific one of said frictional coupling elements;

torque monitoring means for monitoring input torque transmitted to the transmission gear mechanism from an engine;

gear shift monitoring means for monitoring an occurrence of an up-shift of the automatic transmission; and control means for determining first and second target locking pressure appropriate to prevent the automatic transmission from causing a shift shock according to said input torque during said occurrence of an up-shift, said first target locking pressure being determined by a first function such as to increase with an increase in said input torque and said second target locking pressure being determined by a second function such as to be lower than said first target locking pressure for every engine output torque while said engine output torque is in a first range greater than a first specified output torque, controlling said pressure regulating means to regulate said locking pressure to said first target locking pressure during said occurrence of an up-shift when said torque monitoring means monitors said input torque indicating that the engine stays in a loaded state, and controlling said pressure regulating means to regulate said locking pressure to said second target locking pressure during said occurrence of an up-shift when said torque monitoring means monitors said input torque indicating an operational change of the engine from a no-loaded state to said loaded state and being lower than said first specified torque.

8. An automatic transmission control system for selectively activating friction coupling elements to change a power transmission path of a transmission gear mechanism and controlling locking pressure supplied to the friction coupling elements to provide a desired gear ratio between an engine speed of rotation and a speed of rotation of drive wheels, said automatic transmission control system comprising:

speed detecting means for detecting an input speed of rotation to the transmission gear mechanism;

pressure regulating means for regulating a locking pressure level of locking pressure to be supplied to a specific one of said frictional coupling elements;

gear shift monitoring means for monitoring input torque transmitted to the transmission gear mechanism from an engine to determine that the automatic transmission is under a gear shift based on detection of a continuous change in said input speed of rotation indicating an inertia phase of a gear shift by said speed detecting means; and control means for determining first and second target locking pressure appropriate to prevent the automatic transmission from causing a shift shock according to said input torque during said occurrence of an up-shift, said first target locking pressure being determined by a first function such as to increase with an increase in said input torque and said second target locking pressure being determined by a second function such as to be lower than said first target locking pressure for every opening of an engine throttle while said engine throttle is in a first range greater than a first specified opening, controlling said pressure regulating means to regulate said locking pressure to said first target locking pressure during said occurrence of an up-shift when said torque monitoring means monitors said engine throttle opening indicating that the engine stays in a loaded state, and controlling said pressure regulating means to regulate said locking pressure to said second target locking pressure during said occurrence of an up-shift when said torque monitoring means monitors said engine throttle opening indicating an operational change of the engine from a no-loaded state to said loaded state.

9. An automatic transmission control system for selectively activating friction coupling elements to change a power transmission path of a transmission gear mechanism and controlling locking pressure supplied to the friction coupling elements to provide a desired gear ratio between an engine speed of rotation and a speed of rotation of drive wheels, said automatic transmission control system comprising:

a first solenoid for connecting supply of locking pressure to a specific one of said frictional coupling elements;

a second solenoid for regulating a locking pressure level of said locking pressure supplied to said specific frictional coupling element;

a throttle position sensor for monitoring opening of an engine throttle;

a speed sensor for monitoring a vehicle speed; and a control unit for controlling said first and second solenoids based on said opening of said engine throttle and said vehicle speed and providing a shift up command signal for said first solenoid based on predetermined shift patterns specified with respect to said opening of said engine throttle and said vehicle speed as parameters, monitoring an occurrence of an up-shift of the automatic transmission to determine first, second and third target locking pressure appropriate to prevent the automatic transmission from causing a shift shock according to input torque during said occurrence of an up-shift, said first target locking pressure being determined by a first function of throttle opening such as to increase with an increase in said throttle opening, said second target locking pressure being determined by a second function of throttle opening such as to be lower than said first target locking pressure for every throttle opening while said engine throttle is in a first range greater than a first specified opening and said third target locking pressure being determined by a third function of throttle opening such as to be higher than said first target locking pressure while said engine throttle is in a second range smaller than a second specified opening smaller than said first specified opening, controlling said second solenoid to regulate said locking pressure to said first target locking pressure during said occurrence of an up-shift when said throttle position sensor detects said opening of said engine throttle indicating that the engine stays in an loaded state, controlling said second solenoid to regulate said locking pressure to said second target locking pressure during said occurrence of an up-shift when said throttle position sensor detects said opening of said engine throttle indicating an operational change of the engine from a no-loaded state to said loaded state and being greater than said first specified torque, and controlling said second solenoid to regulate said locking pressure to said third target locking pressure when said throttle position sensor detects said opening of said engine throttle indicating an operational change of the engine from said no-load state to said load state and being smaller than said second specified torque.

* * * * *